United States Patent [19]

Heesemann

[11] Patent Number: 5,628,672
[45] Date of Patent: May 13, 1997

[54] BLOWING DEVICE FOR A BELT GRINDING MACHINE

[76] Inventor: Jürgen Heesemann, Bessinger Strasse 27, 32547 Bad Oeynhausen, Germany

[21] Appl. No.: 584,344

[22] Filed: Jan. 11, 1996

[30] Foreign Application Priority Data

Jan. 11, 1995 [DE] Germany .................. 195 00 611.9

[51] Int. Cl.[6] .......................... B24B 21/18; B24B 21/00
[52] U.S. Cl. ...................... 451/5; 451/7; 451/54; 451/296; 451/444; 134/172
[58] Field of Search ..................... 451/296, 444, 451/53, 54, 5, 7; 134/50, 172, 144

[56] References Cited

U.S. PATENT DOCUMENTS

| | | | |
|---|---|---|---|
| 3,812,622 | 5/1974 | Parsons | 451/444 X |
| 4,525,955 | 7/1985 | Cothrell et al. | 451/444 X |
| 4,672,985 | 6/1987 | Mohr | 451/444 X |
| 5,274,964 | 1/1994 | Simpson | 451/444 X |

FOREIGN PATENT DOCUMENTS 421500  3/1974  U.S.S.R. .................. 451/444

*Primary Examiner*—Timothy V. Eley
*Attorney, Agent, or Firm*—Foley & Lardner

[57] ABSTRACT

A blowing device for a belt grinding machine has a nozzle arrangement having nozzles positioned relative to its grinding belt for blowing cleaning air jets onto the circulating grinding belt. The device further has an oscillating drive to oscillate the nozzle arrangement in the longitudinal direction thereof. A pair of elastic members suspend the nozzle arrangement, which is oscillated in the longitudinal direction by using a magnetic field. A ferromagnetic member is connected to the nozzle arrangement and is positioned within the magnetic field produced by an electric coil. By varying the magnetic field, the nozzle arrangement can be moved in the longitudinal direction, the spring providing an elastic restoring force to move the nozzle arrangement is the opposite direction when the magnetic field is turned off.

20 Claims, 3 Drawing Sheets

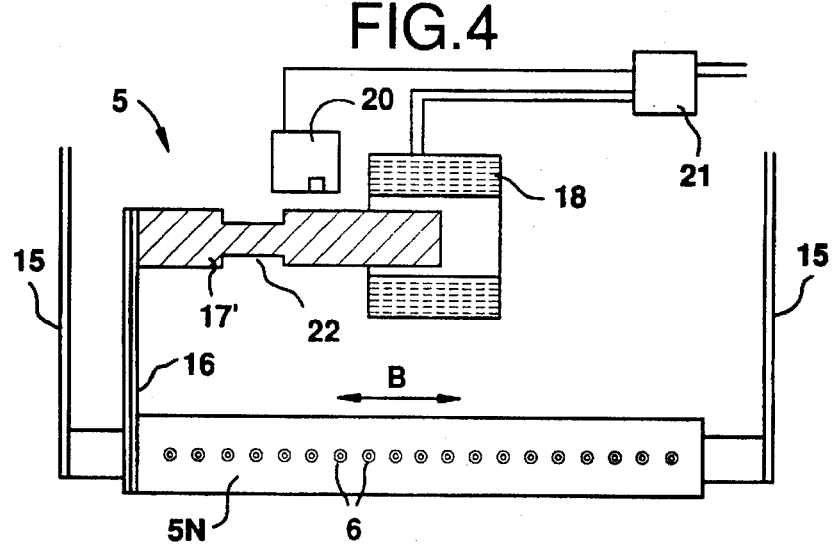
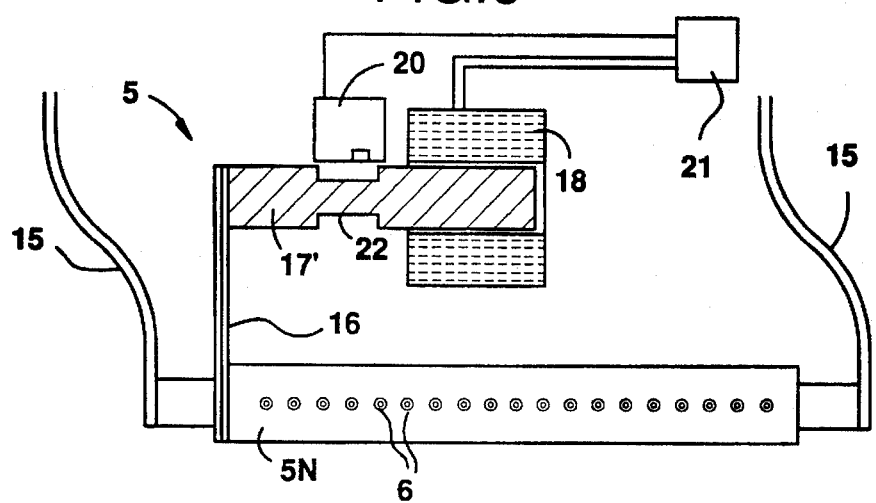
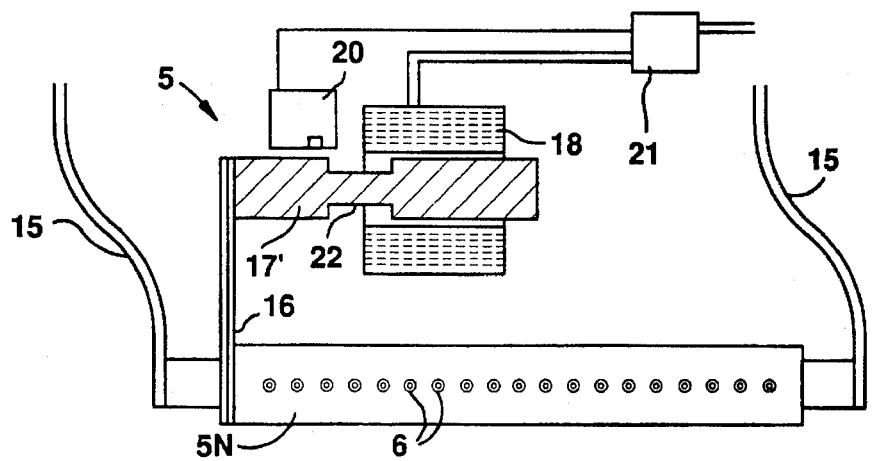

BLOWING DEVICE FOR A BELT GRINDING MACHINE

BACKGROUND OF THE INVENTION

Grinding machines typically use grinding or sanding belts to grind a workpiece. During the grinding operation, the grinding belt picks up and accumulates grinding dust, which has to be removed if the grinding belt is to maintain its effectiveness over a relatively long period. To this end, it is known in a belt type grinding machine to provide an air supplying nozzle arrangement with outlet holes through which fine air jets are supplied. The outlet holes are placed near the location where the grinding belt comes into contact with the workpiece to be ground. The fine air jets from the nozzle arrangement are directed onto the grinding belt to dislodge and move any accumulated grinding dust off the grinding belt. To be as effective as possible with acceptable air consumption, the air jets are spaced linearly along the width of the grinding belt. To be able to clean the grinding belt uninterruptedly over the entire width, the nozzle arrangement is oscillated along the grinding belt width.

It is known to use a pneumatic oscillating drive having a piston of a double-action cylinder to oscillate the nozzle arrangement at a frequency of from 2 to 4 Hz and a stroke of approximately 40–60 mm. This movement is transmitted via pistons to the nozzle arrangement mounted for movement in guide rollers or bearings. This nozzle arrangement is oscillated over the width of the grinding belt.

The shortcoming of this type of blowing device is that the roller/bearing assembly required to hold and guide the nozzle assembly is expensive and is prone to wear. Furthermore, the nozzle arrangement is also subjected to wear. Thus, there is a need for a blowing device or nozzle arrangement that reduces or eliminates these problems.

The present invention fulfills this need.

SUMMARY OF THE INVENTION

The present invention relates to a blowing device or nozzle arrangement for a belt grinding machine, more particularly to an oscillated nozzle arrangement using a magnetic field. Specifically, the blowing device according to the present invention comprises a nozzle arrangement positioned relative to a grinding belt of the grinding machine. This nozzle arrangement is adapted to provide cleaning air jets onto the grinding belt. The blowing device also includes a driver for oscillating the nozzle arrangement along its longitudinal direction. The driver includes a mount for holding and guiding the nozzle arrangement in the longitudinal direction or some other means for suspending the nozzle arrangement, which means enables the nozzle arrangement to move in the longitudinal direction. The driver further includes means for pulling or pushing the nozzle arrangement in the longitudinal direction using a magnetic field. This means can be a ferromagnetic member connected to the nozzle arrangement and a magnetic field generator for generating a magnetic field. The magnetic field generator, for instance, can be an electric coil with a central opening to accommodate the ferromagnetic member. When current is moved through the coil, the generated magnetic field pulls the ferromagnetic member into the opening. In this regard, the ferromagnetic member is positioned adjacent the magnetic field generator so that the ferromagnetic member can be moved by varying the magnetic field and thus move the nozzle arrangement along the longitudinal direction of the nozzle arrangement.

The mount preferably is an elastic suspension for suspending the nozzle arrangement, which suspension provides an elastic restoring force when the suspension is bent or stressed. Similarly, the suspension means can also be a pair of elastic members connected to the nozzle arrangement. The nozzle arrangement thus can be moved in one direction against the elastic restoring force by forming the magnetic field. When the magnetic field is turned off, the elastic restoring force provided by the elastic suspension moves the nozzle arrangement in the opposite direction. Preferably, the elastic suspension or members are a pair of leaf springs connected to the nozzle arrangement.

The on/off switching of current through the coil is preferably controlled by a position sensor. The position sensor can detect the position of the ferromagnetic member to turn on and off or output signals to turn on and off current through the electric coil in response to the detected position of the ferromagnetic member (relative to the position sensor). The ferromagnetic member can be a permanent magnet. When the ferromagnetic member is a permanent magnet, the back and forth movements or the oscillation of the nozzle arrangement can be controlled by changing the polarity of the current through the electric coil. Specifically, the ferromagnetic member can include a first portion, a second portion, and a third portion. Depending on the detected position of the ferromagnetic member, current can be turned on, off, and on (with polarity reversal). For instance, the position sensor can turn on or signal to turn on current through the coil in one direction when the position sensor detects the first portion, turn off or signal to turn off current through the coil when the position sensor detects the second portion, and turn on or signal to turn on current through the coil in the opposite direction (reversed polarity) when the position sensor detects the third position to assist reversal of movement of the nozzle member.

According to the present invention, the extent of the oscillating motion can be controlled precisely in an electromagnetic manner. In this regard, the driver can even oscillate the nozzle arrangement at its resonant frequency.

BRIEF DESCRIPTION OF THE PREFERRED EMBODIMENTS

These and other features, aspects, and advantages of the present invention will become much more apparent from the following description of the exemplary embodiments shown in the drawings and appended claims, where:

FIG. 4 shows a schematic representation of another embodiment according to the present invention in the neutral rest position.

FIG. 5 shows the arrangement of FIG. 4, where the nozzle arrangement is in the actuated intermediate position.

FIG. 6 shows the arrangement of FIG. 4, where the nozzle arrangement is in the actuated extreme position.

DETAILED DESCRIPTION OF THE DRAWINGS

Figure 1:
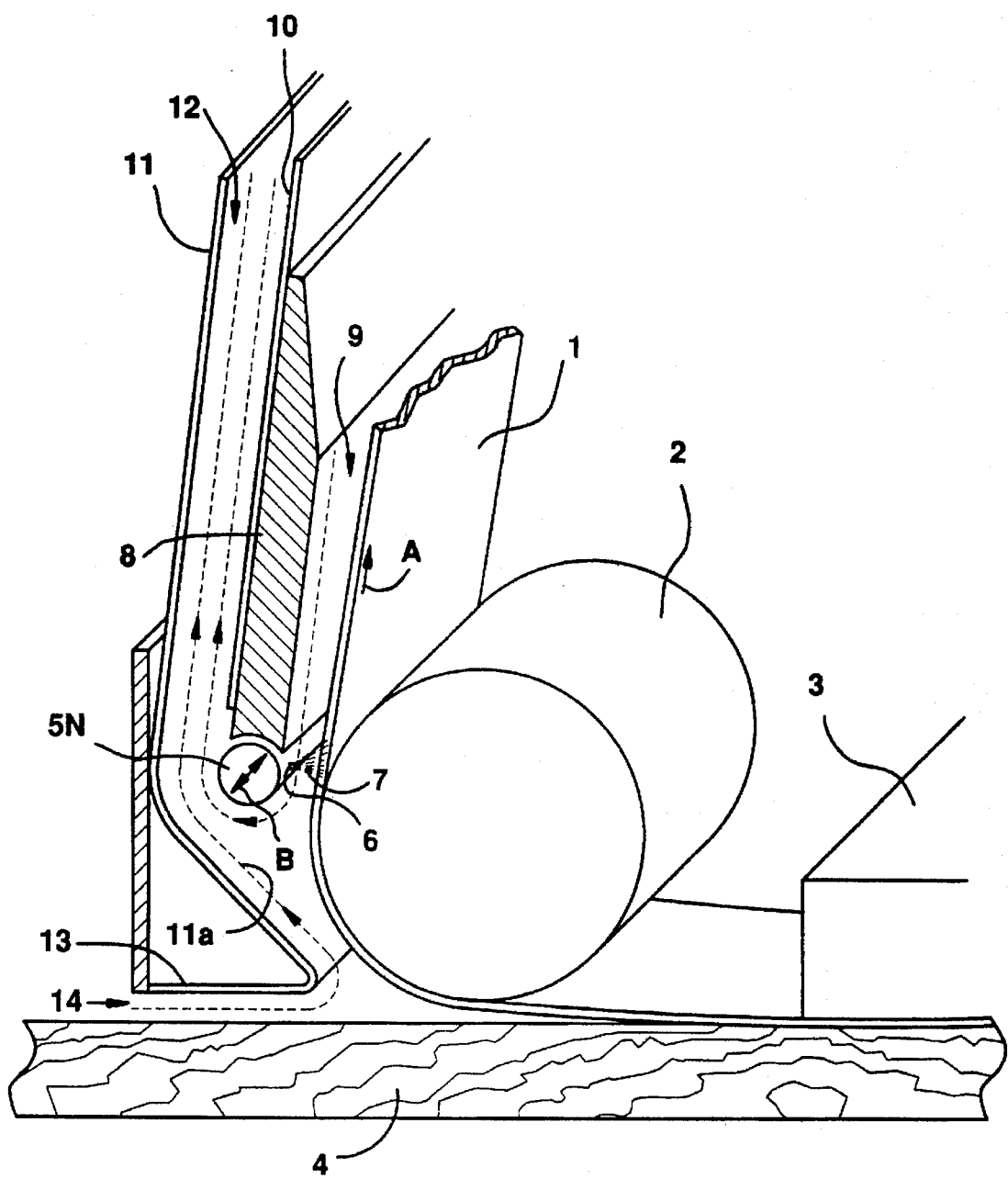
FIG. 1 shows a schematic perspective representation of a grinding device according to the present invention, which has an oscillating nozzle arrangement near a deflection roller that guides its grinding belt.

FIG. 1 shows a blowing device 5 of a grinding machine positioned relative to its circulating grinding belt 1, which device is intended for blowing cleaning air jets onto the grinding belt. The blowing device has a drive, as shown in FIGS. 2–6, for oscillating the nozzle arrangement 5N along its longitudinal direction or axis. FIG. 1 shows, schematically, a part of a belt grinding machine with a circulating grinding belt 1 guided around a deflection roller 2 (which could also be a driving roller). With the aid of a pressure-exerting shoe 3, the grinding belt 1 presses against a workpiece 4, which is guided beneath through the grinding belt 1 to grind the surface. The grinding belt 1 is guided endlessly in circulation by other deflection rollers (not shown) and is driven in the direction of the arrow A shown in FIG. 1 by a driven or driving deflection roller (not shown).

When the grinding belt 1 contacts the workpiece 4 in the region of the pressure-exerting shoe 3, the outer side of the belt 1 in the vicinity of the deflection roller 2 collects or accumulates grinding dust. To clean the grinding belt 1, a tubular blowing device 5 is arranged on the outer side of the deflection roller 2 at a small distance from the grinding belt 1. The blowing device 5 includes a nozzle arrangement 5N, which is typically comprised of a tubular member with a plurality of spaced nozzles or nozzle openings 6 arranged in the longitudinal or axial direction thereof. The nozzles provide fine streams of air or jet 7 therethrough, which air streams are blown against the belt outer side to remove any grinding dust.

To thoroughly clean the grinding belt 1, the interspace between the nozzle openings 6 need to be cleaned. In this regard, the nozzle arrangement 5N is oscillated or moved back and forth in the longitudinal direction B, shown in FIGS. 1, 2, and 4.

A partition wall 8 running parallel to the grinding belt 1 forms, with the grinding belt 1, an air duct 9. The rear side of the wall 8 bears against an air baffle 10, which forms, together with an air baffle 11 running parallel thereto, an extraction duct 12 for removing the air laden with grinding dust. The air baffle 11, which runs substantially parallel to the air baffle 10 above the nozzle arrangement 5N, bends around the nozzle arrangement 5N, and extends toward the deflection roller 2 below the nozzle arrangement 5N. The extension 11a, which is at an incline, has a leg 13 spaced from and running parallel to the workplace 4. The leg and the workpiece underneath the leg 13 together form another air duct 14.

An extraction or suction unit (not shown) for pulling air through the extraction duct 12 forces air through the air ducts 9 and 14, past the grinding belt 1, and into the extraction duct 12. This additionally cleans the belt 1, and transports grinding dust away both from the upper side of the workplace 4 and from the upper side of the grinding belt 1 through the extraction duct 12.

Figure 2:
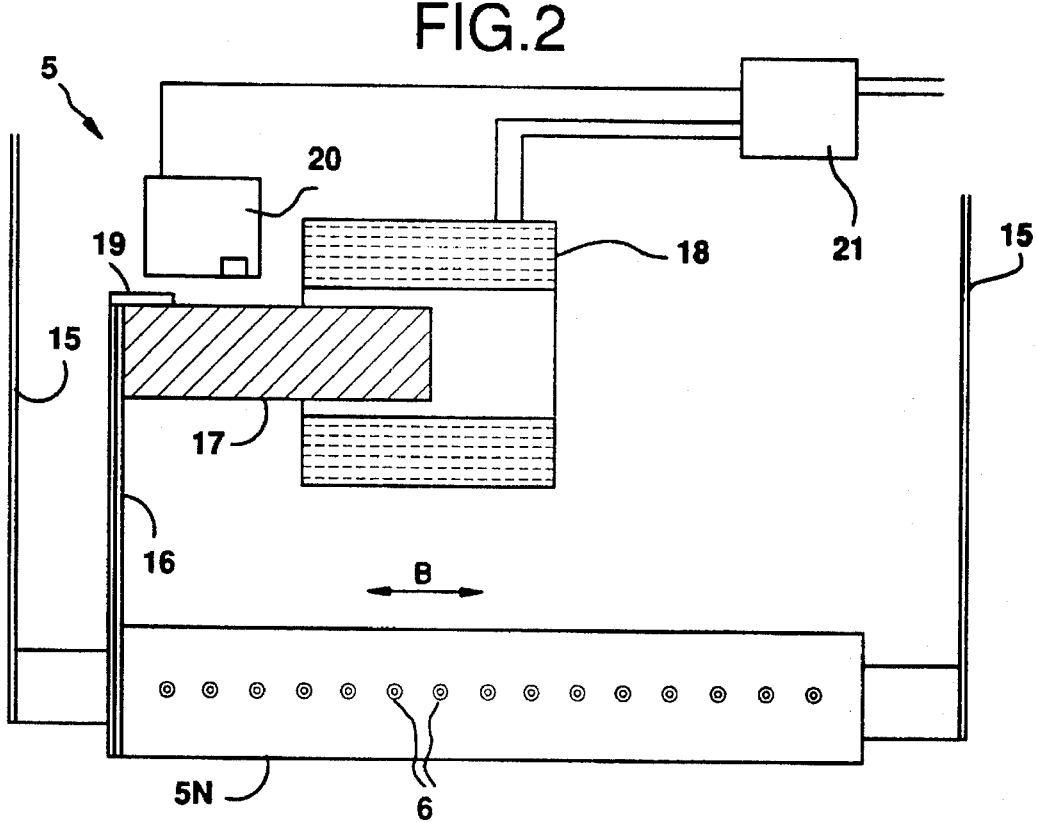
FIG. 2 shows a schematic representation of the drive of the nozzle arrangement in a neutral rest position.
Figure 3:
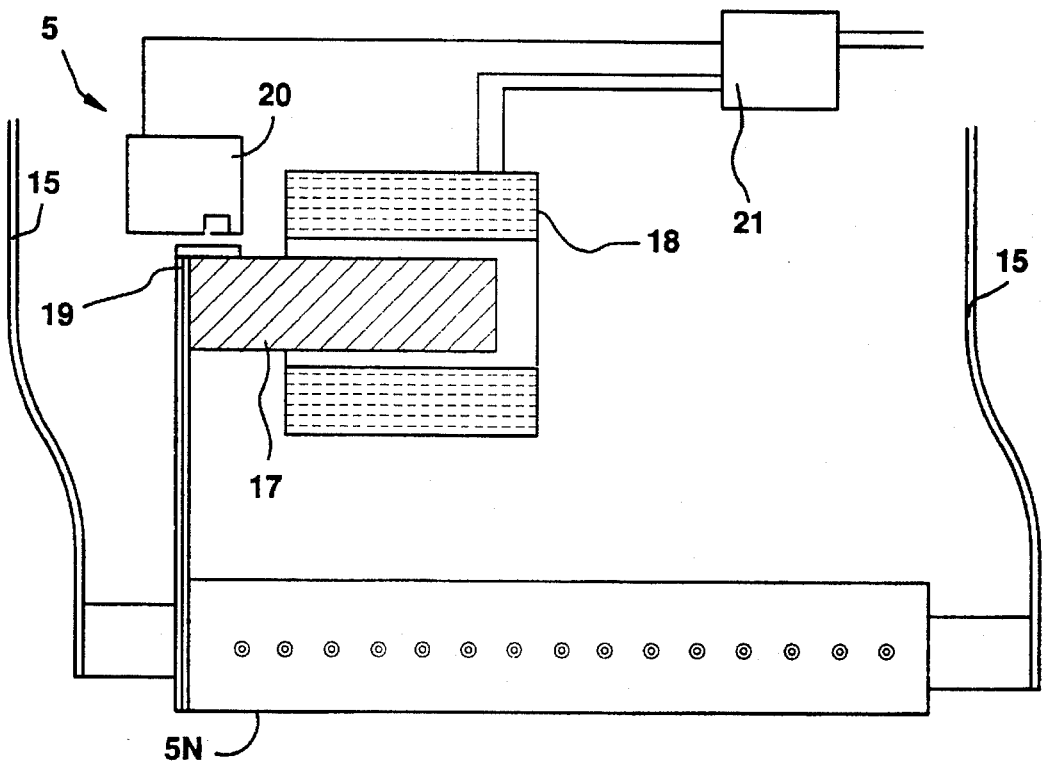
FIG. 3 shows the arrangement of FIG. 2, where the nozzle arrangement is moved to an actuated extreme position.

As illustrated in FIGS. 2 and 3, the nozzle arrangement 5N with the nozzle openings 6 is suspended at both ends by elastic members 15, preferably leaf springs. The flat side of the elastic members or leaf springs 15 are arranged perpendicularly with respect to the longitudinal direction of the nozzle arrangement 5N, thus making it possible for the nozzle arrangement 5N to move laterally in the longitudinal direction. A ferromagnetic member or extension piece 17, such as a permanent magnet or magnetizable member, is connected rigidly to the nozzle arrangement 5N via a substantially rigid connection piece 16, a part of which extension piece extends into the interior of an electric coil 18, a magnetic field generator, as shown in FIG. 2. The ferromagnetic member 17 is arranged substantially parallel with the nozzle arrangement 5N. By moving the ferromagnetic member in its longitudinal direction, the nozzle arrangement is also moved in its longitudinal direction. The ferromagnetic member is also provided with an indicator plate 19, above which a position sensor 20 is arranged. Connected to the position sensor 20 is a control device 21, which selectively switches on and off the flow of current through the electric coil 18 in response to the signals from the position sensor 20 to oscillate the nozzle arrangement.

In the position shown in FIG. 2, the leaf springs 15 are in the neutral, non-loaded state, where the control device 21 has switched off current to the electric coil 18. When the control device 21 switches on the flow of current through the electric coil 18, the ferromagnetic member 17 is drawn further into the interior of the coil 18 as shown in FIG. 3.

FIG. 3 illustrates a position in which the ferromagnetic member 17 is in the extreme "in" position into the coil 18. The indicator plate 19 of the ferromagnetic member 17 and the position sensor 20 inform the control device to reverse or damp the oscillation motion by turning off current to the coil 18. Thus, damping detected results in the control device 21 switching off current through the electric coil 18.

FIG. 3 also shows a position where the leaf springs 15 are stressed or bent by the attractive force of the electric coil 18 and constitutes a peak oscillation (turning point) of the nozzle arrangement movement. The springs also provide an elastic restoring force. Thus, when the current through the electric coil 18 is switched off (as the sensor 20 detects the indicator plate 19), the elastic restoring force restores the nozzle arrangement 5N to the initial position shown in FIG. 2. As the ferromagnetic member 17 moves out of the electric coil 18, the damping is no longer detected by the position sensor 20, causing the control device 21 to switch on current through the electric coil 18 once again. This causes the ferromagnetic member 17 to move into the electric coil 18 as shown in FIG. 3, repeating the oscillating cycle.

As the present oscillating drive arrangement suspends the nozzle arrangement 5N by means of elastic members such as the leaf spring 15 and oscillates it using an electric coil 18, which draws the ferromagnetic extension piece 17 connected to the nozzle arrangement 5N into its interior in a contact-free manner, the present blowing device advantageously is wear-resistant.

The opening of the electric coil 18 into which the ferromagnetic member 17 is drawn is large enough to accommodate a slight change in the vertical position of the ferromagnetic member 17 as it is swung or moved about one end of the leaf springs 15 held in a fixed member (not shown). Thus, the ferromagnetic member 17 moves in and out of the electric coil 18 without striking against the winding thereof.

Alternatively, the oscillating motion may also be controlled in a manner other than with the position sensor 20. For example, the switch-on time may be predetermined or synchronized with the time it would take for the nozzle arrangement 5N to move to its extreme position(s). The current through the electric coil 18 can then be controlled with a built-in timer in the control device 21.

The embodiment represented in FIGS. 4 to 6 differs from that of FIGS. 2 and 3 by way of a different ferromagnetic extension piece or member 17', which is a permanent magnet provided with a cutout 22 resulting in three different zones of detection, a zone before and a zone after the cutout zone. In this embodiment, the nozzle assembly oscillation is controlled by using a permanent magnetic ferromagnetic member 17' and changing the polarity of the current through the electric coil 18. Specifically, when the position sensor 20 detects the first zone (FIG. 4), the portion right of the cutout 22 relative to the drawings, current is applied to the electric coil 18, which draws the electromagnetic member 17' into the coil. As the electromagnetic member 17' is drawn into the coil, the position sensor detects the cutout 22, the second zone (FIG. 5), and signals to switch off current to the electric coil 18. Due to the inertia of the nozzle arrangement 5N, however, even when the magnetic field is turned off, the electromagnetic member 17' does not dampen or reverse its direction immediately. That inertia further drives the ferromagnetic member 17' into the coil 18 until it moves into the third zone (FIG. 6), the portion left of the cutout 22 relative to the drawings, which zone is at its extreme damped "in" position. At this point, the position sensor 20 signals to turn on current to the electric coil 18, but in the opposite direction (reversed polarity) to assist reversal of the nozzle arrangement movement. By reversing the polarity, the magnetic field acts against the ferromagnetic member 17' in the opposite direction to prevent overshooting. This ensures a reliable protection against excessive overshooting even where, for energy reasons, the nozzle arrangement 5N is driven at the resonant frequency thereof.

According to the present invention, the aforementioned problems are solved by oscillating a nozzle arrangement along its longitudinal direction using a ferromagnetic member connected to the nozzle arrangement, which member is positioned in the magnetic field of an electric coil and moved in the longitudinal direction by varying the magnetic field. This enables the nozzle arrangement to be driven in a contactless manner with the aid of the electric coil and the ferromagnetic member interacting with the electric coil. The present invention enables the nozzle arrangement to oscillate in the longitudinal direction in a fully wear-resistant manner, thus ensuring an overall wear-resistant oscillating drive for the nozzle arrangement and permitting a high oscillating frequency.

Given the disclosure of the present invention, an ordinary skilled artisan would readily appreciate the fact that there may be other embodiments and modifications well within the scope and spirit of the present invention. Accordingly, all expedient modifications readily attainable by an ordinary skilled artisan from the present disclosure within the scope and spirit of the present invention are to be included as further embodiments of the present invention. The scope of the present invention accordingly is to be defined as set forth in the appended claims.

I claim:

1. A blowing device for a belt grinding machine, comprising:
    a nozzle arrangement adapted to be positioned relative to a grinding belt of the grinding machine, wherein the nozzle arrangement is adapted to provide cleaning air jets onto the grinding belt; and
    a driver for oscillating the nozzle arrangement along a longitudinal direction of the nozzle arrangement, the driver comprising:
        a mount for holding and guiding the nozzle arrangement in the longitudinal direction; and
        a ferromagnetic member connected to the nozzle arrangement;
        a magnetic field generator for generating a magnetic field, wherein the ferromagnetic member is positioned adjacent the magnetic field generator and is moved by varying the magnetic field, the nozzle arrangement being moved along the longitudinal direction by moving the ferromagnetic member.

2. A blowing device according to claim 1, wherein the ferromagnetic member is a permanent magnet.

3. A blowing device according to claim 2, further comprising a position sensor for detecting the position of the ferromagnetic member to turn on and off the magnetic field generator in response to the position of the ferromagnetic member relative to the position sensor.

4. A blowing device according to claim 1, wherein the mount comprises an elastic suspension for suspending the nozzle arrangement, the elastic suspension providing an elastic restoring force when the suspension is bent or stressed, wherein the nozzle arrangement is moved in one direction against the elastic restoring force by turning on the magnetic field generator.

5. A blowing device according to claim 4, wherein the elastic restoring force provided by the elastic suspension moves the nozzle arrangement in the opposite direction when the magnetic field generator is turned off.

6. A blowing device according to claim 5, further comprising a position sensor for detecting the position of the ferromagnetic member to turn on and off the magnetic field generator in response to the position of the ferromagnetic member relative to the position sensor.

7. A blowing device according to claim 5, wherein the magnetic field generator is an electric coil with a central opening to accommodate the ferromagnetic member, wherein the ferromagnetic member is pulled into the opening when current is moved through the coil.

8. A blowing device according to claim 7, further comprising a position sensor for detecting the position of the ferromagnetic member to turn on and off current through the electric coil in response to the position of the ferromagnetic member relative to the position sensor.

9. A blowing device according to claim 8, wherein the ferromagnetic member is a permanent magnet and has a first portion, a second portion, and a third portion, wherein the position sensor signals to turn on current through the coil in one direction when the position sensor detects the first portion, signals to turn off current through the coil when the position sensor detects the second portion, and signals to turn on current through the coil in the opposite direction when the position sensor detects the third portion to assist reversal of movement of the nozzle member.

10. A blowing device according to claim 9, wherein the elastic suspension is a pair of leaf springs connected to the nozzle arrangement.

11. A blowing device according to claim 4, further comprising a position sensor for detecting the position of the ferromagnetic member to turn on and off the magnetic field generator in response to the position of the ferromagnetic member relative to the position sensor.

12. A blowing device according to claim 11, wherein the elastic suspension is a pair of leaf springs connected to the nozzle arrangement.

13. A blowing device according to claim 4, wherein the elastic suspension is a pair of leaf springs connected to the nozzle arrangement.

14. A blowing device according to claim 1, further comprising a position sensor for detecting the position of the ferromagnetic member to turn on and off the magnetic field generator in response to the position of the ferromagnetic member relative to the position sensor.

15. A blowing device according to claim 1, wherein the driver oscillates the nozzle arrangement at its resonant frequency.

16. A blowing device for a belt grinding machine, comprising:
    a nozzle arrangement adapted to be positioned relative to a grinding belt of the grinding machine, wherein the nozzle arrangement is adapted to provide cleaning air jets onto the grinding belt; and a driver for oscillating the nozzle arrangement along a longitudinal direction of the nozzle arrangement, the driver comprising:

means for suspending the nozzle arrangement, which means enables the nozzle arrangement to move along the longitudinal direction; and means for pulling or pushing the nozzle arrangement in the longitudinal direction using a magnetic field.

17. A blowing device according to claim 16, wherein the suspending means comprises a pair of elastic members connecting the nozzle arrangement, the elastic members providing an elastic restoring force when the members are bent or stressed, wherein the nozzle arrangement is moved in one direction against the elastic restoring force using the magnetic field and wherein the elastic restoring force moves the nozzle arrangement in a direction opposite the one direction.

18. A blowing device according to claim 17, wherein the pulling or pushing means comprises a ferromagnetic member connected to the nozzle arrangement and an electric coil for selectively generating a magnetic field to attract the ferromagnetic member and move the nozzle arrangement.

19. A blowing device according to claim 18, further comprising a position sensor for detecting the position of the ferromagnetic member to turn on and off the magnetic field in response to the position of the nozzle arrangement.

20. A blowing device according to claim 19, wherein the ferromagnetic member is a permanent magnet and has a first portion, a second portion, and a third portion, wherein the position sensor signals to turn on current through the coil in one direction when the position sensor detects the first portion, signals to turns off current through the coil when the position sensor detects the second portion, and signals to turn on current in a reverse direction opposite the one direction through the coil when the position sensor detects the third portion to assist reversal of movement of the nozzle arrangement.

* * * * *